(12) United States Patent
Beall et al.

(10) Patent No.: US 8,425,830 B2
(45) Date of Patent: Apr. 23, 2013

(54) PERMEABLE MATERIAL, ARTICLES MADE THEREFROM AND METHOD OF MANUFACTURE

(75) Inventors: George Halsey Beall, Big Flats, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 314 days.

(21) Appl. No.: 12/866,944

(22) PCT Filed: Feb. 26, 2009

(86) PCT No.: PCT/US2009/001211
§ 371 (c)(1), (2), (4) Date: Aug. 10, 2010

(87) PCT Pub. No.: WO2009/108330
PCT Pub. Date: Sep. 3, 2009

(65) Prior Publication Data
US 2010/0326029 A1    Dec. 30, 2010

Related U.S. Application Data

(60) Provisional application No. 61/067,686, filed on Feb. 29, 2008.

(51) Int. Cl.
*C04B 38/00* (2006.01)
*C04B 35/624* (2006.01)
*C04B 33/04* (2006.01)

(52) U.S. Cl.
USPC .......................................... 264/628; 264/630

(58) Field of Classification Search ............ 55/522–524; 422/169–172, 177–182; 264/628, 630
See application file for complete search history.

(56) References Cited

U.S. PATENT DOCUMENTS

| | | | | |
|---|---|---|---|---|
| 4,239,519 | A | * | 12/1980 | Beall et al. ................... 65/134.4 |
| 4,442,175 | A | * | 4/1984 | Flannery et al. .............. 428/404 |
| 4,483,944 | A | * | 11/1984 | Day et al. ..................... 502/439 |
| 4,808,460 | A | * | 2/1989 | Chyung et al. ................ 428/116 |
| 5,549,725 | A | * | 8/1996 | Kasai et al. ..................... 55/523 |
| 7,947,103 | B2 | * | 5/2011 | Masukawa et al. ............. 55/524 |
| 8,097,220 | B2 | * | 1/2012 | Ramberg et al. .............. 422/211 |
| 2006/0251909 | A1 | * | 11/2006 | Beall et al. .................... 428/454 |
| 2007/0190631 | A1 | * | 8/2007 | Kreutzer et al. .............. 435/183 |
| 2009/0095158 | A1 | * | 4/2009 | Ziebarth et al. ................. 95/283 |
| 2011/0178212 | A1 | * | 7/2011 | Dicke et al. ................... 524/100 |

FOREIGN PATENT DOCUMENTS

| | | | |
|---|---|---|---|
| JP | 1297145 | * | 11/1989 |
| JP | 1-298078 | | 12/1989 |
| JP | 1298078 | * | 12/1989 |

OTHER PUBLICATIONS

Machine translation of JP1-298078.
Chinese Office Action.

* cited by examiner

*Primary Examiner* — Duane Smith
*Assistant Examiner* — Amber Orlando
(74) *Attorney, Agent, or Firm* — Walter M. Douglas

(57) ABSTRACT

The invention is directed to a honeycomb comprising cordierite and beta-spudomene, the honeycomb a having total porosity of greater than 30% and a mean pore diameter of less than 5 μm. The honeycomb is made from a mixture of activated kaolin and a mineral selected from the group consisting of lithium fluorhectorite, lithium hydroxyhectorite and mixtures thereof. In one embodiment up to 20 wt % SiO2, based on the total weight of the kaolin and minerals (fluarhectorite, hydroxyhectorite) is added and mixed therein prior to the formation of the green body. In another embodiment the amount of added SiO2 is up to 10 wt %. In one embodiment the total porosity is greater than 50% and the mean pore diameter is less than 5 μm.

8 Claims, 1 Drawing Sheet

10 μm

2 μm

PERMEABLE MATERIAL, ARTICLES MADE THEREFROM AND METHOD OF MANUFACTURE

CROSS-REFERENCE TO RELATED APPLICATIONS

This application claims the benefit of priority under 35 U.S.C. §119(e) of U.S. Provisional Application Ser. No. 61/067,686 filed on Feb. 29, 2008.

FIELD

The invention is directed to a permeable material and articles made therefrom, and in particular to articles such as honeycombs that can be used as substrates for catalysts and/or for particulate filtration from the gas streams, for example, engine exhaust gas streams.

BACKGROUND

Wall-flow filters for removing particular matter from a gaseous stream, also called filter traps, are known in the art and the general class of wall-flow filters is perhaps best represented by diesel engine filter traps. Diesel filter traps are well known in the art and some have proven to be extremely efficient at removing carbon particles ("soot") from the exhaust of diesel engines. The most widely used type of diesel trap is the wall-flow filter which is designed to capture the soot on the wall of the filter as the exhaust passed through the porous walls of the filter. The wall-flow filter has been designed to provide for nearly complete filtration of soot without significantly hindering the exhaust flow. The material presently used to filter particulates from a diesel exhaust stream is high porosity material with mean pore sizes above 10 microns in size. These large pores effectively trap the bulk of diesel particulate emissions, including virtually all large carbonaceous particles, and they create only a modest pressure drop, not seriously affecting engine efficiency.

Unfortunately, a small percentage of particulate matter, very fine carbonaceous material, is not easily trapped by materials of relatively coarse porosity (>5 um pore size), and can escape through the filter. Although this material is a small part by weight of the total emissions, it may be significant in terms of a different measure which is the number of particles per unit volume of exhaust.

While proposals have been made regarding how to eliminate the very fine particles (for example, use of an additional very-small pore filter) such proposals have not proven practical for various reasons such as cost or the backpressure associated with very small particle filter traps. The present invention offers a reasonable solution to the problem of removing fine particles from any gaseous stream; for example, an engine exhaust gas stream.

SUMMARY

In one embodiment the invention is directed to a porous ceramic article having a mean pore size of <5 μm and a high permeability with a total porosity of greater than 30%. In another embodiment the total porosity is greater than 40%. In a further embodiment the total porosity is greater than 50%. The article can be in the shape of a honeycomb, block, disc, sheet, concave and/or convex item, or other shaped item(s) as may be desirable.

In another embodiment the invention is directed to a ceramic honeycomb having a cordierite phase and a β-spodumene phase, the ceramic honeycomb being porous and having a mean pore size of <5 μm. In one embodiment the honeycomb has a total porosity of greater than 30%. In another embodiment the honeycomb has a total porosity greater than 40%. In a further embodiment the honeycomb has a total porosity greater than 50%.

In a further embodiment the invention is directed to a monolithic particulate filter for removing particulate matter from a gaseous stream, the filter trap having a mean pore size of less than <5 μm and a high permeability with a total porosity of greater than 30%. In another embodiment the honeycomb has a total porosity greater than 40%. In a further embodiment the honeycomb has a total porosity greater than 50%.

In an additional embodiment the invention is directed to a wall-flow trap for a gaseous stream, the trap being a wall-flow trap having a cordierite phase and a β-spodumene phase, a mean pore size of <5 m and a total porosity of greater than 30%. In another embodiment the honeycomb has a total porosity greater than 40%. In a further embodiment the honeycomb has a total porosity greater than 50%.

In another embodiment the honeycombs according to invention have a CTE of less than $25 \times 10^{-7}/°$ C. In a further embodiment the CTE is less then $15 \times 10^{-7}/°$ C.

In a further embodiment the invention is directed to a method of making a honeycomb comprising a material with a mean pore size of less than <5 μm and a high permeability with a total porosity of greater than 30%, the method comprising the steps of forming an aqueous gelatinous slurry (hereinafter also called "slurry") or gel comprising 1 mole lithium fluorhectorite [$Li(Mg_2Li)Si_4O_{10}F_2$)] or lithium hydroxyhectorite [$Li(Mg_2Li)Si_4O_{10}(OH)_2$)] (or mixtures thereof, including solid solutions of lithium (fluor/hydroxy) hectorite [$Li(Mg_2Li)Si_4O_{10}(OH)F$)]) and 1.5-4 moles activated kaolin, adjusting the thickness of the gelatinous slurry by adjustment of the water content so that the slurry or gel can be extruded or otherwise shaped to form a "green" body, firing the "green" body at a temperature in the range of 1000° C. to 1250° C. for a time in the range of 1-100 hours to form a ceramic article and cooling the ceramic article. In a further embodiment the firing temperature and time are in the range of 1100° C. to 1200° C. for a time in the range of 40-60 hours. In another embodiment the method comprises the addition of up to 20 wt % excess $SiO_2$ based on the total weight of lithium fluorhectorite (and/or hydroxyhectorite) plus kaolin in the aqueous slurry. In a further embodiment the excess $SiO_2$ is added in an amount of up to 10% of the total weight of lithium fluorhectorite (and/or hydroxyhectorite) plus kaolin (the hectorite materials and kaolin also being collectively referred to herein as the "inorganics"). The green body can also be dried to remove excess moisture prior to firing. Drying, usually done electrically, is typically done at a temperature in the range of 350-500° C. for a time in the range of 5-30 minutes, Drying help "firm up" the green body so there is little or no sag during the firing cycle. In another embodiment the honeycomb has a total porosity greater than 40%. In a further embodiment the honeycomb has a total porosity greater than 50%. The method of the invention has the advantage of achieving relatively high porosity while not requiring the use of pore forming additives.

In a further embodiment the invention is directed to a method of making an article, for example a honeycomb, comprising a material with a mean pore size of less than <5 μm and a high permeability with a total porosity of greater than 30%, the method comprising the steps of forming an aqueous gelatinous slurry or gel comprising lithium fluorhectorite [$Li(Mg_2Li)Si_4O_{10}F_2$)] or lithium hydroxyhectorite [Li (Mg$_2$Li)Si$_4$O$_{10}$(OH)$_2$)] or (fluor/hydroxy)hectorite Li(Mg$_2$Li)Si$_4$O$_{10}$(OH)F)], and mixtures thereof, and activated kaolin in a molar ratio between 1:1.5 and 1:4, respectively, adjusting the thickness of the gelatinous slurry or gel by adjustment of the water content so that the slurry can be extruded to form a "green" body, firing the "green" body at a temperature in the range of 1100° C. to 1200° C. for a time in the range of 40-50 hours to form a ceramic article and cooling the ceramic article. In another embodiment the methods comprises the addition of up to 20 wt % excess SiO$_2$ based on the total weight of lithium fluorhectorite (or hydroxyhectorite) plus kaolin in the aqueous slurry or gel. In a further embodiment the excess SiO$_2$ is added in an amount of up to 10% of the total weight of lithium fluorhectorite (or hydroxyhectorite) plus kaolin (the inorganics). The green body can also be dried to remove excess moisture prior to firing. Drying, usually done electrically or by induction heating, is typically done at a temperature in the range of 350-500° C. for a time in the range of 5-30 minutes, Drying help "firm up" the green body so there is little or no sag during the firing cycle. The method of the invention has the advantage of achieving relatively high porosity while not requiring the use of pore forming additives.

In an addition embodiment the invention is directed to a porous article having a made of a permeable material, the article having a total porosity of greater than 30% and a mean pore size of <5 µm, the composition comprising activated kaolin and a hectorite material selected from the group consisting of fluorhectorite, hydroxyhectorite and (fluor/hydroxy)hectorite and mixtures thereof, wherein the molar ratio of the hectorite material to kaolin is in the range of 1:1.5 to 1:4, and, optionally, the composition further comprises up to 20 wt % SiO$_2$ based on 100% of the total inorganics. In an additional embodiment the total porosity if greater than 40%. In a further embodiment the total porosity is greater than 50%.

In another embodiment the invention is directed to a method of making an article, for example a honeycomb, comprising the steps of forming a gelatinous slurry or gel comprising activated kaolin and a material selected from the group consisting of lithium fluorhectorite, lithium hydroxyhectorite and mixtures thereof, and lithium (fluor/hydroxy) hectorite; forming a green body from said slurry or gel; drying the green body, and firing the green body to form a honeycomb having a composition comprising cordierite and β-spodumene. Optionally, up to 20 wt % additional silica, based on the total weight of the inorganics, can be added to the composition before forming the green body. In a preferred embodiment up to 10 wt % additional silica is added. The method produces article having a total porosity of greater than 30%, preferably greater than 40%; and more preferably greater than 50%. The article has a mean pore size of less than 5 µm.

DETAILED DESCRIPTION

Figure 1:
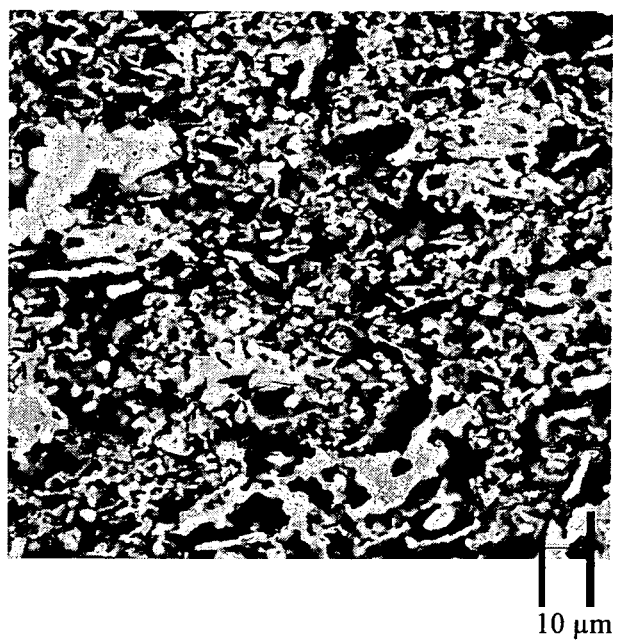
FIG. 1 is a micrograph, 10 µm scale, showing the microstructure of the ceramic of the invention derived from lithium fluorhectorite and activated kaolin, 5% excess SiO$_2$.
Figure 2:
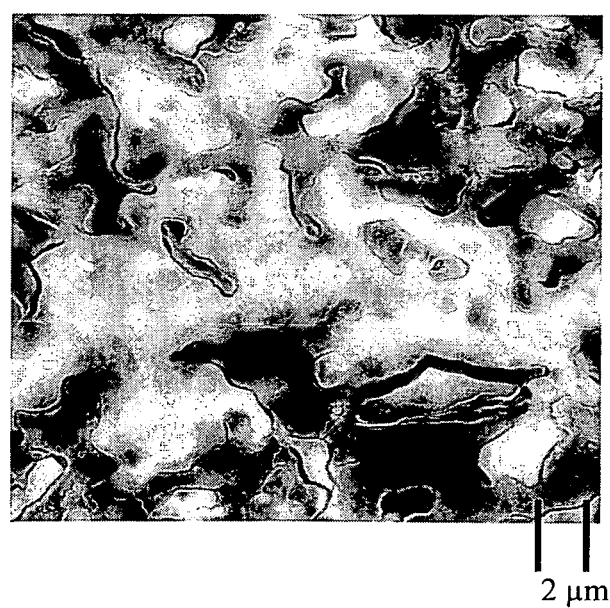
FIG. 2 is a micrograph, 2 µm scale, showing the microstructure of the ceramic of the invention derived from lithium fluorhectorite and activated kaolin, 5% excess SiO$_2$.

In one embodiment the invention is directed to a honeycomb for removing fine particulate matter from a gaseous stream; for example, an exhaust stream from an engine, a gas stream from a manufacturing plant or other gas streams that may contain particular matter. The invention is further directed to a wall-flow filter, also called herein a "particulate filter," for removing fine particulate matter from a gaseous stream; for example, an exhaust stream from an engine, a gas stream from a manufacturing plant or other gas streams that may contain particular matter. In particular, the invention is directed to a particulate filter for removing carbonaceous particles from the exhaust stream of a hydrocarbon fueled engine, and more particularly removing carbonaceous particles of size 2 µm or less. The particulate filter of the invention has an average pore size of <5 µm and a high cell wall permeability with a total porosity of greater than 30%. In another embodiment the total porosity is greater than 40%. In a further embodiment the total porosity is greater than 50%. The particulate filter can be mounted behind a conventional particulate filter in order to trap the bulk of the very fine particles that escape through the conventional particulate filter.

The making of honeycomb substrates has been described in numerous patents; for example, U.S. Pat. Nos. 7,309,371, RE38,888, 6,864,198, 6,803,087, 6,541,407, 5,409,810, 5,296,423, and 3,958,508, all of whose teaching are incorporated herein by reference. In a summary fashion, to make a cordierite honeycomb, as explained in U.S. Pat. No. 5,296, 434, a base batch is formed from (in weight percent, wt %) 11.5-16.5% MgO, 33-41% Al$_2$O$_3$ and about 46.6-53.0% SiO$_2$. Kaolin, preferably activated kaolin, and the base batch are mixed together, the amount of kaolin being between 5 and 30 wt % and preferably about 10-16 wt %. The foregoing materials are then made into an aqueous slurry to form an extrudable or moldable mixture. The slurry can contains extrusion aids such as a binder and/or a lubricant and liquid vehicles such as water. The extrudable/moldable mixture can then be formed into any desired geometry using conventional ceramic forming processed. The extrusion process is ideal for forming honeycomb substrates for use in diesel and gasoline engines whether mobile or stationary. The "green body" form by extrusion is typically dried for 1-20 minutes to remove excess water and then fired at a temperature between 1340° C. and 1450° C. for a soak time in the range of 6-12 hours to substantially complete the conversion to cordierite.

The invention involves combining synthetic Li-fluorhectorite or Li-hydroxyhectorite, including mixtures thereof, with kaolin or related clay materials and water to form a gelatinized slurry which can be formed into a honeycomb article such as a monolith (a "green" body) and subsequently firing the green body to form a permeable microcrystalline and microporous (>30% total porosity, average pore size <5 um) ceramic body with low coefficient of thermal expansion. (Porosity herein was measured by mercury porosimetry). Pore forming additives are not required. Upon firing, the initial phases of fluorhectorite and kaolin react to yield a ceramic material that is a mixture of largely cordierite and β-spodumene solid solution phases, which yields the low CTE. In a further embodiment the total porosity is greater than 40%. In a further embodiment the total porosity is greater than 50%.

The making of slurries containing Li-fluorhectorite for use in making ceramic papers, films, fibers, boards and coating, but not monolithic substrates, has been described in U.S. Pat. Nos. 4,239,519, 4,297,139 and 4,339,540, whose teachings are incorporated herein by reference. Hectorite is a water-swelling clay mineral that forms a sol or gel upon contact with water. Lithium fluorhectorite (also called herein "fluorhectorite") reacts with water to not only make a slurry, but also a translucent sol-gel. Synthetic fluorhectorite gel and its method of preparation are described in U.S. Patents assigned to Corning: U.S. Pat. Nos. 4,239,519; 4,297,139; and 4,339,540. The composition of lithium fluorhectorite is $Li(Mg_2Li)Si_4O_{10}F_2$. Activated kaolin is a fired clay of composition $Al_2Si_2O_7$. The composition of lithium hydroxhectorite is $Li(Mg_2Li)Si_4O_{10}(OH)_2$ (also called herein hydroxyhectorite). The composition of lithium (fluor/hydroxy)hectorite is $Li(Mg_2Li)Si_4O_{10}F(OH)$ (also called herein (fluor/hydroxy)hectorite).

In accordance with the invention, the activated kaolin and the fluorhectorite are mixed with water to form a gelatinous slurry. The thickness of the slurry can be controlled by adjusting the water content. Once the slurry has been formed it is extruded or molded according to methods well know in the art in order to form a "green" ceramic article (e.g. a honeycomb monolith; herein, for exemplary purposes, only extruded honeycomb substrates are described). The extruded honeycomb article is then fired at a temperature in the range of 1000 to 1250° C. for a time in the range of 1 to 100 hours. For example, a "green" ceramic or body was fired at 1150° C. for 48 hours to form a ceramic article.

As an example, Li-fluorhectorite and activated kaolin were combined in the following proportions to yield, after extruding and firing, a cordierite/β-spodumene article of the following estimated composition:

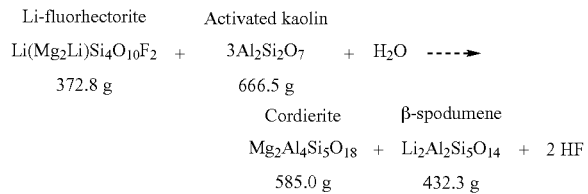

On a molar basis, the initial composition was approximately 1 mol of fluorhectorite to 3 moles of activated kaolin, After extrusion, firing, etc., X-ray diffraction revealed the presence of some spinel (<10% by weight, typically <5%), $MgAl_2O_4$, in addition to cordierite and β-spodumene. The amount of spinel in the fired body can be controlled by the addition of excess silica to the composition. For example, in order to aid in the reaction producing cordierite instead of spinel, additional silica was added to the composition in the amounts of 5 and 10% excess of 100% (of the total weight of the composition). For example in the above equation the total weight of starting materials is 1039.3 g. At 5% additional $SiO_2$ an additional 52 g of $SiO_2$ would be added. The resulting materials had a reduced spinel content and were evaluated to selected properties. The additional $SiO_2$ is added to inhibit the formation of and/or decrease the amount of a spinel phase within the finished product. The additional silica can be added as a powder (for example without limitation, Cab-O-Sil™ from Cabot Corporation) or a "slurry" or "suspension" (for example without limitation, Ludox™ from Grace Chemical).

In another example one (1) mole of lithium fluorhectorite was reacted with two (2) moles of activated kaolin and the resulting mixture was used to prepare an article containing cordierite and β-spodumene. The CTEs of the 1:3 and 1:2 compositions, both also containing an added 10% $SiO_2$, were compared after the green bodies of the two formulations were fired at 1100° C. The CTE of the 1:3 ratio product was somewhat lower than that of the 1:2 product, the values being $10.10 \times 10^{-7}$/° C. for the 1:3 product and $12.2 \times 10^{-7}$/° C. for the 1:2 product. When fired at 1150° C. the difference between the two CTE values was smaller. Generally, the articles/honeycombs of the invention have a CTE of less than $25 \times 10^{-7}$/° C. over the temperature range of 22-1000° C. In preferred embodiment the CTE of compositions of the invention is of less than $15 \times 10^{-7}$/° C. over the temperature range of 22-1000° C.

The following properties were measured for cordierite/β-spodumene honeycombs prepared as described above using the 1:3 composition:

No excess $SiO_2$: CTE (22-1000° C.)=$19.4 \times 10^{-7}$/° C.;
with 5% excess $SiO_2$: CTE (22-1000° C.)=$10.1 \times 10^{-7}$/° C.; and
with 10% excess $SiO_2$: CTE (22-1000° C.)=$10.7 \times 10^{-7}$/° C.

The corresponding porosity values (PV) and mean pore diameters (MPD) are as follows:

No excess $SiO_2$: 47.7% PV and 3.1 um MPD;
with 5% excess $SiO_2$: 55.2% PV and 3.6 um MPD; and
with 10% excess: 58.3% PV and 1.78 um MPD, respectively.

The foregoing data clearly indicates the compositions of the invention can form a honeycomb body having a combination of low CTE (~$10 \times 10^{-7}$/° C.), high porosity (>30%), and mean pore diameters in the range below 5 um. The HF gas produced as an effluent during firing process was controlled through the use of scrubbers. Replacing some or all of the Li-fluorhectorite by Li-hydroxyhectorite [$(Li(Mg_2LiSi_4O_{10}(OH)_2$], either from raw material sources or produced synthetically by hydrothermal techniques, can be used to eliminate or reduce the HF effluent.

While the invention has been described with respect to a limited number of embodiments, those skilled in the art, having benefit of this disclosure, will appreciate that other embodiments can be devised which do not depart from the scope of the invention as disclosed herein. It should also be understood that in addition to honeycombs other shapes can be made using lithium fluorhectorite [$Li(Mg_2Li)Si_4O_{10}F_2$)] or lithium hydroxyhectorite [$Li(Mg_2Li)Si_4O_{10}(OH)_2$)] or mixtures thereof, including solid solutions of lithium (fluor/hydroxy)hectorite) and activated kaolin. Accordingly, the scope of the invention should be limited only by the attached claims.

We claim:

1. A method of making a honeycomb comprising the steps of:
   forming a gelatinous slurry or gel comprising activated kaolin and a material selected from the group consisting of lithium fluorhectorite, lithium hydroxyhectorite and mixtures thereof, and lithium (fluor/hydroxy)hectorite, without the addition of pore forming agents;
   forming a green body from said slurry or gel,
   drying the green body, and
   firing the green body to form a honeycomb having a composition comprising cordierite and β-spodumene, the honeycomb having a total porosity greater than 30% and a mean pore diameter of less than 5 μm.

2. The method according to claim 1, wherein said method further comprises adding to the slurry or gel and mixing therein before forming the green body up to 20 wt % of $SiO_2$, based on the of the total weight of kaolin and material selected from the group consisting of fluorhectorite, hydroxyhectorite, and mixtures thereof, and lithium (fluor/hydroxy)hectorite.

3. The method according to claim 2, wherein the amount of $SiO_2$ added to the slurry or gel before forming the green body is up to 10 wt % based on 100% of the total inorganics.

4. The method according to claim 1, wherein said green body is fired at a temperature in the range of 1000° C. to 1250° C. for a time in the range of 1 to 100 hours.

5. A method of making a honeycomb comprising the steps of:
- forming a gelatinous slurry or gel comprising activated kaolin and a material selected from the group consisting of lithium fluorhectorite, lithium hydroxyhectorite and mixtures thereof, and lithium (fluor/hydroxy)hectorite, without the addition of pore forming agents, wherein the molar ratio of the "hectorite" material to kaolin in the range of 1:1.5 to 1:4;
- forming a green body from said slurry or gel,
- drying the green body, and
- firing the green body to form a honeycomb having a composition comprising cordierite and β-spodumene and having a total porosity of greater than 50% and a mean pore diameter of less than 5 µm.

6. The method according to claim 4, wherein said method further comprises adding to the slurry or gel and mixing therein before forming the green body up to 20 wt % of $SiO_2$, based on the of the total weight of kaolin and material selected from the group consisting of fluorhectorite, hydroxyhectorite, and mixtures thereof, and lithium (fluor/hydroxy)hectorite.

7. The method according to claim 5, wherein the amount of $SiO_2$ added to the slurry or gel before forming the green body is up to 10 wt % based on 100% of the total inorganics.

8. The method according to claim 4, wherein said green body is fired at a temperature in the range of 1000° C. to 1250° C. for a time in the range of 1 to 100 hours.

* * * * *